May 16, 1967 P. F. BURCH 3,319,442
FLESHING MACHINE

Filed Feb. 1, 1965 2 Sheets-Sheet 1

INVENTOR.
PAUL F. BURCH

BY

ATTORNEYS

INVENTOR.
PAUL F. BURCH

ATTORNEYS

United States Patent Office 3,319,442
Patented May 16, 1967

3,319,442
FLESHING MACHINE
Paul F. Burch, Rockford, Mich., assignor to Wolverine Shoe & Tanning Corporation, Rockford, Mich., a corporation of Michigan
Filed Feb. 1, 1965, Ser. No. 429,354
7 Claims. (Cl. 69—42)

This invention relates to a machine for fleshing animal skins, and more particularly to a novel high speed fleshing machine.

After the meat is cut off the hide of butchered animals such as hogs, excess remaining flesh, usually in the form of fatty tissue, must be removed from the skin to prepare the skin for tanning. This is conventionally done on a "fleshing" machine. A fleshing machine includes a revolving fleshing roll with sharp edged, peripheral, helical blades, an adjacent grooved revolving pinch roll that advances the skin past the fleshing roll, and a shiftable rubber covered friction roll that carries each skin into the other two rolls and maintains it in advancing relation thereto. A fleshing machine operator lays the skin about ⅔ of its length over the rubber roll, and actuates the roll to shift the skin against the constantly revolving bladed fleshing roll and the constantly revolving grooved pinch roll. The skin is allowed to be advanced by the pinch roll until this part of the skin is "defleshed" or, as stated in the art, "fleshed." Then the rubber covered friction roll is retracted. The skin is removed, turned end for end, and reinserted over the rubber roll, so that the other part can be fed over the friction roll and fleshed. Normally, driving mechanism for the rubber roll engages as the roll shifts in by engagement of a pair of meshing gears.

With present fleshing machines, the pinch roll constantly rotates. Also, the rubber roll tends to keep spinning even after it is shifted away from the fleshing and pinch rolls, even though the gears which drive it are disengaged. This, of course, would impart a frictional pulling action on the skin, therefore requiring the operator to wait until the roll stops spinning before inserting a skin since otherwise the skin would be rolled out to him before the rubber roll could shift the skin against the fleshing roll. This of course slows the operation, and lessens output. The problem of incomplete control of the machine elements by the operator, introducing unpredictable motions, with possible resulting skin damages, incomplete skinning, and operator injuries, is therefore always present. Pigskins are particularly slippery to handle and grip, requiring the operator to grasp them very securely to overcome the action of the rolls after each fleshing step.

Another disadvantage of present fleshing machines is the tendency for the disengaged driver and driven gears to hit on the gear teeth tips rather than intermeshing when re-engaged. This causes a sprung steel pinch roll journal or a sprung friction roll journal.

The slippery condition of the skin also presents another problem of control with feed. This involves the position of the pinch roll with respect to the rubber roll. It has been found that excellent control is achieved only when the pinch roll is directly vertically above the rubber roll. Yet after considerable usage, the rolls wear, particularly the rubber roll, so that its contact with the overlying pinch roll is not directly vertical. In other words, the plane passing through both roll axes and the contact line therebetween is not directly vertical, but slanted. This change of relation also occurs after the fleshing blades have been repeatedly sharpened, so as to reduce the diameter of the fleshing roll. In either case, the rubber roll shifts into the machine further than at first, before it pushes the skin against the fleshing roll. Extensive experience and experimentation have shown that this causes unpredictable feeding in of the pigskin. Since the skin is so slippery, the operator often cannot control it when this happens, thereby resulting in damage to the skin and possible injury to the operator.

It is an object of this invention to provide a fleshing machine having controlled operational characteristics that provide the operator with greater safety, while lessening potential damage to the skins.

Another object of this invention is to provide a fleshing machine enabling exact control over the skin in-feed by exact and complete stoppage of the rubber roll upon removal of the rubber roll from operative relation with the fleshing roll and pinch roll. Moreover, rotation of the rubber roll is automatically and smoothly restarted at an exactly controlled optimum time with shifting of the skin into operative relation to the other rolls for fleshing.

Still a further object of this invention is to provide a fleshing machine which is not only more predictable and safer to operate, but which is actually faster in operation than conventional fleshing machines, to cause greater output. The rubber roll is shifted into and out of operative relationship to the fleshing roll and pinch roll rapidly and exactly, at the same time causing exact rotational stoppage and starting of the rubber roll and pinch roll in relation thereto.

Still a further object of this invention is to provide a fleshing machine wherein the pinch roll does not rotate constantly, but is controllably stopped and started simultaneously with the rubber roll for optimum cooperation therewith.

Another object of this invention is to provide a fleshing machine of controlled characteristics allowing constant exact relation of the pinch roll with respect to the rubber roll, even after extensive use of the rolls with wear of the rubber roll and/or repeated sharpening of blades of the fleshing roll, both resulting in consequent change in roll diameter and change in roll relationships. The fleshing machine enables relocation of the pinch roll to accommodate decreasing diameters of the other rolls, so that the plane passing through the axis of the rubber roll, the axis of the pinch roll, and the line of contact between the rolls is exactly vertical.

These and several other objects of this invention will become apparent upon studying the following specification in conjunction with the drawings in which.

Figure 2:
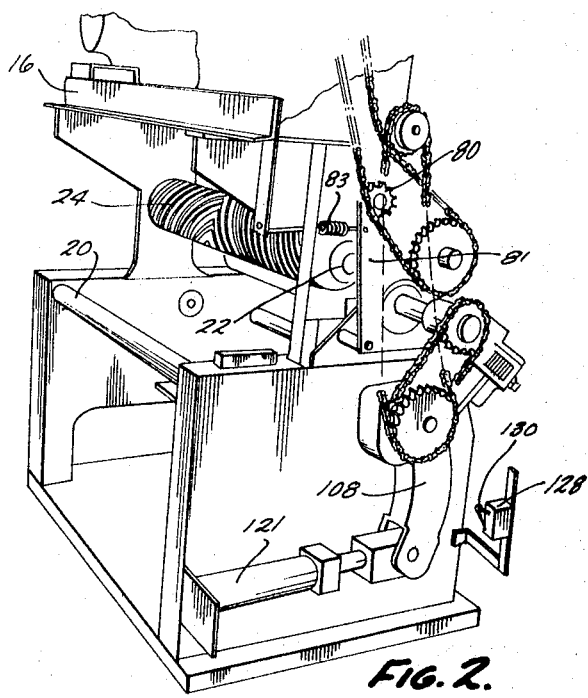
FIG. 2 is a perspective view of the back side and the same end as that shown in FIG. 1.
Figure 3:
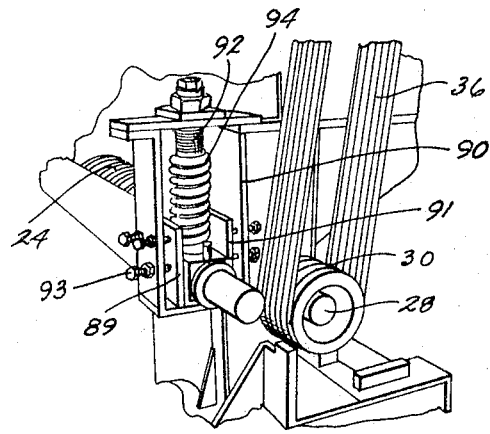
FIG. 3 is a perspective view of the opposite end and front of the fleshing machine.

Referring now specifically to the drawings, the complete fleshing machine 10 includes a frame assembly that has a pair of spaced vertical upright end supports 12 and 14 interconnected by a top bracing and platform member 16 and preferably by a plurality of rigid bar supports, e.g. 18 and 20. Rotatably mounted on end bearings 22 (FIG. 2), attached to these supports, is a bladed fleshing roll 24. In conventional fashion, the fleshing roll includes peripheral, helical, spaced blades having sharp outer edges. These extend helically toward the center of the roll from the two opposite ends, to meet in overlapping, V-shaped junctures. On the extended end shaft 28 of this fleshing roll is mounted pulley means 30 (FIG. 3), around which drive belts 36 pass from the flesher drive motor 38. This motor is controlled by a suitable conventional switch 40.

Mounted on the same control panel 44 as switch 40 is a second control switch 42 for motor 46. On the output shaft of motor 46 is mounted a shaft brake mechanism 48 which supplies a braking force to the motor when it is shut off. This, for example, may be any of conventional spring biased or electromagnetically operated brakes which are to be normally held out of engagement with the shaft upon opening or closing of a circuit with switch 42.

Figure 4:
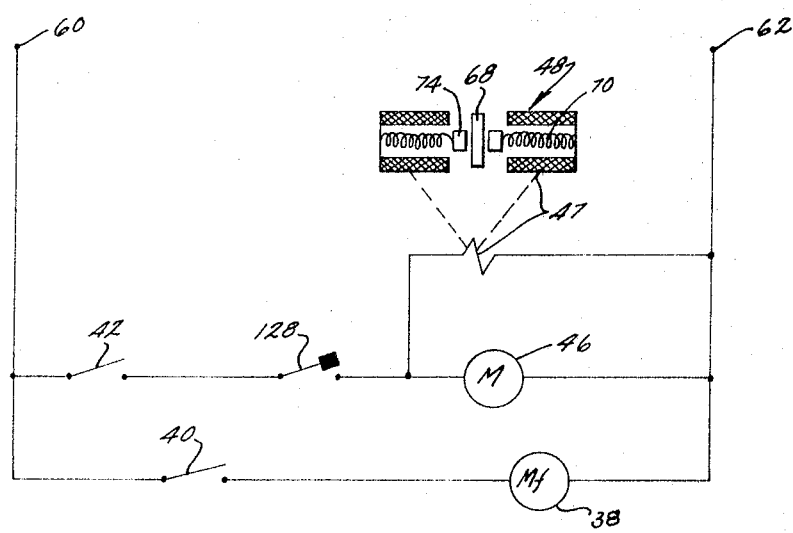
FIG. 4 is a circuit diagram of a typical control circuit for the novel fleshing machine.

Referring to FIG. 4, as one example, the power supply to leads 60 and 62 may be applied to flesher motor 38 by closing of a manual switch 40. Also, with closing of manual switch 42 and a special microswitch 128, drive motor 46 is actuated, and electromagnet assembly 47 on brake mechanism 48 on output shaft 68 of motor 46 is actuated, for example, by being retracted against the force of compression biasing springs 70. (Any other suitable motor brake of the several available may be employed.) Upon opening of switch 128 loss of power causes springs 70 to apply brakes 74 against motor shaft 68 to stop it immediately.

This output shaft 68 has a sprocket 76 mounted thereon, around which a flexible endless driven element, specifically drive chain 78, passes. The drive chain also passes around an idler sprocket 80 on the upper end of a pivot arm 81 biased toward the chain by a spring 83, and around a driven sprocket 82 mounted on the extended end shaft 84 of pinch roll 86.

The pinch roll has its end shafts mounted in a pair of journals 88, vertically slidable in a pair of respective guide tracks 90. These are attached to the lower end of threaded adjuster shafts 92. A surrounding compression coil spring 94 around each shaft biases the journals to the bottom of the tracks. The pinch roll is mounted at an elevation slightly above that of the fleshing roll, and with a slight overlap of the fleshing roll periphery, horizontally, so that vertical movement of the pinch roll causes variation in the small spacing between the flesher roll and pinch roll. Coil springs 94 enable the pinch roll to shift upwardly under the influence of an extraordinary force between it and the fleshing roll, with subsequent return to its original position with removal of the force. This prevents damage to the structure in case of excess pressure caused by an irregularity in skin thickness. The threaded adjusters 92, therefore, actually control the compression on springs 94.

The journals 88 for the end shafts of pinch roll 86 are mounted in a novel manner allowing optimum fleshing action even after extensive use of the machine. Each journal is a block positioned between a pair of plates 89 and 91, and floatable laterally toward and away from the fleshing roll. The vertical walls forming the vertical guide tracks 90 are wide enough to allow the journals to be shifted laterally, relatively toward and away from the fleshing roll. This movement is controlled by set screws 93 extending through and threadably engaged with the fixed walls. They abut the outer faces of straddle plates 89 and 91 on the inner ends of the screws. Thus the pinch roll can be shifted at least about an inch toward the fleshing roll. When the rubber roll means and/or the fleshing roll blades are sharpened, and the rolls thus decrease in diameter, the extra shifting in of the rubber roll to move into operative relation to the fleshing roll causes it to move out of direct vertical relation to the pinch roll. The pinch roll position is then adjusted by inserting the outer set screws and withdrawing the inner ones to shift the pinch roll until it is directly over the top of the rubber roll in the inner position of the latter.

Driven chain 78 also passes around a sprocket 96 on shaft 98 to cause adjacent sprocket 100 to rotate also. Around sprocket 100 is a second chain 102 which passes around sprocket 104 mounted on shaft 106. This shaft serves as a fulcrum for pivotal movement of a pair of counterbalanced pivot arms 108 on opposite ends of the machine. This pair of arms supports the rubber bed roll 112, which basically has a solid center covered by a thick layer of cushioned rubber on its periphery. The end shafts of this roll are mounted in journals 113. These are mounted on the ends of threaded shafts 114 around each of which is a compression coil spring 116 to bias the roll to the inner ends of the slides for the journals. Shafts 114 control the compression bias on the journals.

On the extended end shaft of rubber bed roll 112 is a driven sprocket 118, around which an endless flexible driving element, preferably a chain 120 passes from a second sprocket 122 on shaft 106. This drive chain 120, therefore, extends radially outwardly from pivot point 106 of the assembly, to the end of the rubber roll, to provide a proper driving connection therewith, no matter what the shifted position of the roll and arms happens to be.

Figure 1:
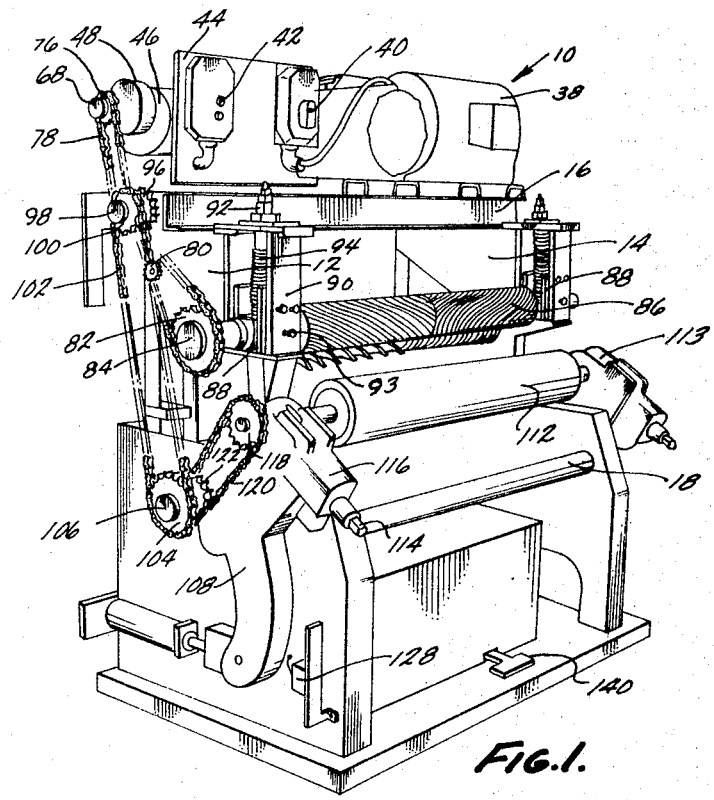
FIG. 1 is a perspective view of one end and the front of the novel fleshing machine.

The pair of arms is pivotally shifted on shaft 106 by a pair of fluid cylinders 121 on opposite ends of the assembly. Each is mounted between one of the frame supports and the lower end of the respective support arm 108. Extension of these cylinders shifts rubber bed roll 112 into operative relation to the pinch roll and fleshing roll, closely spaced thereto, while retraction of the cylinders shifts the rubber roll out of engagement with the other two rolls to the position illustrated in FIGS. 1 and 2.

Mounted adjacent the lower end of one of arms 108 is the microswitch assembly 128. This switch is normally open, and is closed by shifting of its follower 130 with the lower end of support arm 108 when the rubber roll is shifted into operative relation to the other two rolls. Closing of this switch 128 activates motor 46 and solenoid 47 to release the brake mechanism 48 on the output shaft of the motor. Hence, the chains are driven to operate pinch roll 86 and rubber roll 112 just as the three rolls are brought into operative relationship with each other, as the rubber roll is introducing a skin.

In operation, therefore, switch 40 is actuated to start the flesher motor 38 to drive fleshing roll 24 at high speeds through the belt and pulley connections 36, 30 on shaft 28. The person operating the machine then drapes the animal skin to be fleshed over rubber bed roll 112, with the fleshy side up. He shifts a foot valve 140 to cause fluid from a suitable pressurized source (not shown) to flow to cylinders 120. This extends the cylinders, pivoting support arms 108 on shaft 106, to place rubber bed roll 112 into operative relationship with the pinch roll and the fleshing roll, while carrying the skin into the machine. When the rubber roll is immediately adjacent the other rolls, arm 108 shifts follower 130 of limit switch 128, closing it to actuate motor 46 and release motor brake 48. Thereby, chains 78, 102 and 120 are driven through the respective several sprockets to rotate pinch roll 86 and rubber roll 112. The animal skin is advanced into the flesher by the pinch roll while fleshing roll 24 severs the fatty tissue therefrom. When the skin is about half fleshed, the operator releases foot valve 140, causing cylinders 120 to retract and shift the assembly, so that rubber bed roll 112 is shifted out of engagement with the other two rolls to its initial position, thereby carrying the partially defleshed skin out of the assembly. Simultaneously, with movement of arms 108, limit switch 128 is closed, thereby shutting off power to motor 46 and also releasing solenoid 47, allowing springs 70 to apply brake 74 to the output shaft 68 of motor 46. This immediately stops the motor drive assembly so that pinch roll 86 and rubber roll 112 are rotationally stationary. Thus, the skin is not shifted further by the mechanism, but rather the machine allows the operator complete control over the skin. The skin can be readily withdrawn without having to overcome friction of a rolling rubber roll. The skin is then turned end for end, so that the other half portion is ready to be fleshed. Upon draping the skin over the roll, the skin is not pulled into the machine since it still is not rotating.

The unit is then actuated again by depression of foot lever 140 to extend cylinders 120, thereby pivoting arms 108, to shift rubber bed roll 112 into relation with pinch roll 86 and fleshing roll 24. Simultaneously, switch 28 again is actuated to start motor 46 and release brake 48.

Thus, it will be observed that complete control over the structure is attained by the operator, automatically, since the pinch roll and rubber roll stop immediately upon release of the operative relationship, and start again only when the rubber roll is brought adjacent the pinch roll and fleshing roll. There is no wait for the friction roll to stop rotating.

The drive connection to the rubber friction roll is always engaged and complete, rather than requiring disengaging and re-engaging gears as previously. The result is much smoother and quieter action, with no chance for mis-engagement to cause spring journals.

Further, adjustment of the pinch roll relationship with respect to the fleshing roll and rubber roll can be periodically made by resetting the set screws controlling the end journal position, thereby accounting for reduced diameter of the fleshing roll with repeated sharpenings, and reduced diameter of the rubber roll with wear. The pinch roll can always be positioned directly vertically above the rubber roll in the inner position of the latter.

Moreover, cylinder actuated arms 108 achieve rapid operation so that only an extremely slight time delay occurs with in-feed shifting of rubber bed roll 112.

It has been found with actual experimentation and use of the machine for fleshing hog skins, that it is completely dependable, functionally, and achieves a much higher production output, yet with complete control and far greater safety to the operator.

It is conceivable that certain details of construction could be modified within the concept presented herein, once those having ordinary skill in this field study the foregoing form of the invention. Hence, the invention is intended to be limited only by the scope of the appended claims and the reasonably equivalent srtuctures to those defined therein.

I claim:

1. A fleshing machine comprising: a framework including a pair of end supports; a bladed fleshing roll rotatably mounted to said framework between said supports; a grooved, skin advancing pinch roll rotatably mounted to said framework adjacent and parallel to said fleshing roll; a pair of arms shiftably mounted to the respective end supports; a bed roll rotatably mounted between said arms, and shiftable toward and away from said fleshing roll and pinch roll with shifting of said arms; first drive motor means and drive connection means therefrom to said fleshing roll; second drive motor means including motor braking means; drive connection means from said second motor means to said bed roll; and electrical control means in controlling electrical relation to said second motor means and braking means, and positioned to be actuated with shifting of said arms and bed roll to control said second motor means and braking means and cause immediate stoppage and starting of said bed roll with movement thereof out of and into operative engagement with said fleshing roll and pinch roll.

2. A fleshing machine comprising: a framework including a pair of end supports; a bladed fleshing roll rotatably mounted to said framework between said supports; a grooved pinch roll rotatably mounted to said framework adjacent and parallel to said fleshing roll; a pair of shiftable rocker arms pivotally mounted to the respective end supports; a bed roll rotatably mounted between said rocker arms, and shiftable toward and away from said fleshing roll and pinch roll with pivoting of said rocker arms; first drive motor means, and drive connection means therefrom to said fleshing roll; second drive motor means including motor braking means; drive connection means for said second motor means to said bed roll; electrical switch means in controlling relation to said second motor means and braking means to enable immediate stoppage and starting of said bed roll with movement out of and into operative engagement with said fleshing roll and pinch roll; and said switch means being mounted adjacent one of said rocker arms to be actuated thereby when said rocker arms are shifted to shift said bed roll into said operative engagement.

3. A fleshing machine comprising: a framework including a pair of end supports; a bladed fleshing roll rotatably mounted to said framework between said supports; a grooved pinch roll rotatably mounted to said framework adjacent and parallel to said fleshing roll; a pair of shiftable rocker arms pivotally mounted to the respective end supports; a bed roll rotatably mounted between said rocker arms, and shiftable toward and away from said fleshing roll and pinch roll with pivoting of said rocker arms; first drive motor means, and drive connection means therefrom to said fleshing roll; second drive motor means having motor braking means thereon; control means for said second motor means and braking means; and flexible endless drive connection means from said second drive motor to both said shiftable roll and said pinch roll, enabling the latter two rolls to be stopped during continued operation of said fleshing roll.

4. A fleshing machine comprising: a framework including a pair of end supports; a bladed fleshing roll rotatably mounted to said framework between said supports; a grooved pinch roll rotatably mounted to said framework adjacent and parallel to said fleshing roll; a pair of shiftable rocker arms pivotally mounted to the respective end supports; a bed roll rotatably mounted between said rocker arms, and shiftable toward and away from said fleshing roll and pinch roll with pivoting of said rocker arms; power means operatively mounted between said arms and said framework to shift said arms and said bed roll; first drive motor means, and drive connection means therefrom to said fleshing roll; second drive motor means; drive connection means from said second drive motor means to both said bed roll and said pinch roll; and electrical switch means in operative control relation to said second drive motor means and mounted adjacent one of said rocker arms to be closed by said one rocker arm upon shifting of said arms to move said bed roll into operative relation to said fleshing roll and pinch roll, and to be opened by movement of said arms and bed roll away therefrom; whereby said bed roll and pinch roll are stopped and started upon shifting movement of said bed roll and arms.

5. A fleshing machine comprising: a framework including a pair of end supports; a bladed fleshing roll rotatably mounted to said framework between said supports; a grooved pinch roll rotatably mounted to said framework adjacent and parallel to said fleshing roll; a pair of shiftable rocker arms pivotally mounted to the respective end supports; a bed roll rotatably mounted between said rocker arms, and shiftable toward and away from said fleshing roll and pinch roll with pivoting of said rocker arms; power cylinder means operatively mounted between said arms and said framework to shift said arms and said bed rolls; first drive motor means, and drive connection means therefrom to said fleshing roll; second drive motor means including motor braking means; chain and sprocket drive connection means from said second drive motor to both said bed roll and said pinch roll; and electrical switch means in operative control relation to said second drive motor and motor braking means, and mounted adjacent one of said rocker arms to be actuated by said one rocker arm upon shifting of said arms to move said bed roll into operative relation to said fleshing roll and pinch roll, and deactuated by movement of said arms and bed roll away therefrom; whereby said bed roll and pinch roll are instantly stopped and started upon movement of said bed roll.

6. A fleshing machine comprising: a framework including a pair of spaced end supports; a power driven bladed fleshing roll rotatably mounted to said framework between said supports; a grooved pinch roll rotatably mounted to said framework adjacent to, parallel to, and laterally and upwardly offset from said fleshing roll; a pair of bed roll supports shiftably mounted to the respective end supports; a bed roll rotatably mounted between said roll supports, and shiftable toward and away from said fleshing roll and pinch therewith; drive motor means and drive connection means therefrom to said bed roll, and braking means therefor; and electrical control means in electrical controlling relation to said braking means to cause immediate stoppage and starting of said bed roll with movement thereof out of and into operative engagement with said fleshing roll and pinch roll.

7. A fleshing machine comprising: a framework including a pair of end supports; a bladed fleshing roll rotatably mounted to said framework between said supports; a grooved pinch roll rotatably mounted to said framework adjacent and parallel to said fleshing roll; a pair of shiftable rocker arms pivotally mounted to the respective end supports; a bed roll rotatably mounted between said rocker arms, and shiftable toward and away from said fleshing roll and pinch roll with pivoting of said rocker arms; power cylinder means operatively mounted between said arms and said framework to shift said arms and said bed roll; first drive motor means, and drive connection means therefrom to said fleshing roll; second drive motor means including motor braking means; chain and sprocket drive connection means from said second drive motor to both said bed roll and said pinch roll; electrical switch means in operative control relation to said second drive motor and motor braking means, and mounted adjacent one of said rocker arms to be actuated by said one rocker arm upon shifting of said arms to move said bed roll into operative relation to said fleshing roll and pinch roll, and deactuated by movement of said arms and bed roll away therefrom, whereby said bed roll and pinch roll are instantly stopped and started upon movement of said bed roll; said drive connection means from said second drive motor to said bed roll including sprocket means on said motor, sprocket means coaxial with the pivot axis of said arms, and sprocket means on said bed roll, and including chain means radially along said arms and around said latter two sprockets; flexible endless drive connection means from the said second drive motor means to said pinch roll; said pinch roll including end shafts; bearing journals receiving said end shafts; journal supports including vertically extending retention track means on said framework receiving said journals; biasing means against said journals normally retaining said journals in a fixed position, but enabling temporary, vertical movement against the bias; said journal supports allowing journal movement laterally toward and away from said fleshing roll; and means cooperative with said supports to adjustably fix the journal positions, enabling the pinch roll to be placed directly above said bed roll.

References Cited by the Examiner

UNITED STATES PATENTS

| | | | |
|---|---|---|---|
| 1,239,748 | 9/1917 | Travis | 69—42 |
| 2,471,984 | 5/1949 | Stehling | 69—42 |
| 2,685,791 | 8/1954 | Hall | 69—42 |
| 2,867,109 | 1/1959 | Phillips | 69—42 |
| 2,932,185 | 4/1960 | Bode | 69—42 |

FOREIGN PATENTS

| | | |
|---|---|---|
| 588,773 | 2/1925 | France. |
| 324,155 | 8/1920 | Germany. |

JORDAN FRANKLIN, *Primary Examiner.*

A. R. GUEST, *Assistant Examiner.*